United States Patent [19]
Metzger et al.

[11] Patent Number: 5,615,319
[45] Date of Patent: Mar. 25, 1997

[54] METHOD FOR MODIFYING A GEOMETRIC OBJECT AND COMPUTER AIDED DESIGN SYSTEM

[75] Inventors: Michael Metzger, Herrenberg; Hermann Kellermann, Tuebingen, both of Germany

[73] Assignee: Hewlett-Packard Company, Palo Alto, Calif.

[21] Appl. No.: 438,851

[22] Filed: May 11, 1995

Related U.S. Application Data

[63] Continuation of Ser. No. 4,595, Jan. 14, 1993, abandoned.

[30] Foreign Application Priority Data

Jan. 16, 1992 [EP] European Pat. Off. .............. 92100634

[51] Int. Cl.$^6$ .................................................. G06F 15/00
[52] U.S. Cl. ............................................................ 395/127
[58] Field of Search ..................................... 395/133, 141, 395/142, 127; 345/121, 118

[56] References Cited

U.S. PATENT DOCUMENTS 4,821,214  4/1989  Sederberg ............................... 364/522

FOREIGN PATENT DOCUMENTS 0277832  8/1988  European Pat. Off. .

OTHER PUBLICATIONS

Forsey et al., "Local Refinement Editing of B. Spline Surfaces" Graphic Interface 88, 10 Jun. 88, pp. 125–126.
Rogers, David F., et al., "Dynamic Rational B–Spline Surfaces," Computer–Aided Design, vol. 22, No. 9, Nov. 1990, pp. 609–616.
Forsey, D. R., et al., "Local Refinement Editing of B–Spline Surfaces," (Abstract), Proceedings of Graphics Interface '88, Canadian Information Processing Society, Jun. 1988, pp. 125–126.

*Primary Examiner*—Phu K. Nguyen

[57] ABSTRACT

In a computer aided design system, a geometric object is defined as a function, preferably a B-Spline, of a piecewise polynomial function. In order to make a local modification of said geometric object, a point of origin (P) is picked. A second point (P') is defined as a target point through which the modified function should pass. The move from the point of origin (P) to the target point (P') is transformed into a move, preferably a parallel shift, of the control points of the associated control polygons.

13 Claims, 8 Drawing Sheets

METHOD FOR MODIFYING A GEOMETRIC OBJECT AND COMPUTER AIDED DESIGN SYSTEM

This is a continuation of application Ser. No. 08/004,595, filed Jan. 14, 1993, now abandoned.

FIELD OF THE INVENTION

The present invention relates to the field of computer aided design (CAD) systems and, more particularly, to a method for modifying a geometric object which is defined as a function of an at least piecewise polynomial function. A geometric object in this sense may be any representation of a physical object, i.e., of an object of the real world, particularly, but not limited to, metal or wooden parts, especially machine parts, printed circuit boards, integrated circuits, buildings and the like. The term "geometric object" relates to two- or three-dimensional representations of the same, like top views, side views and cross sections (2-dimensional) or perspective views (3-dimensional). It also relates to 1-dimensional representations, like boundary representations, and even to corner representations. In this sense, a boundary line of a representation of a physical object is also called "geometric object" herein. One could instead also use the term "representation of a physical object".

DESCRIPTION OF THE BACKGROUND ART

Today's computer aided design (CAD) systems are used for a variety of applications, such as mechanical or electronic engineering. A common characteristic of all of these applications is that parts, whether mechanical, electronic or of whatever kind, are designed in interactive mode. That is, the part—as far as already designed—is displayed on a screen (e.g. as two-dimensional, or as perspective view) such as a CRT (cathode ray tube) or an LCD (liquid crystal display). The user enters commands via appropriate input means, preferably a computer mouse, a graphics tablet or a light pen, in order to complement or modify the existing structure. When the editing process is finished, i.e., the part is defined, it may be plotted or otherwise be reproduced. It is also possible to generate punch or magnetic tapes which then directly control a numerically controlled machine tool, in order to manufacture a physical representation of the object.

It is understood that it is quite easy to generate or modify parts (or their contour) of simple geometry, such as straight lines, circles, arcs, cylinders, spheres and the like, as these can be expressed and calculated in simple mathematical terms and equations. However, the task becomes more complicated for surfaces and boundary lines which cannot easily be expressed in analytical mathematical terms, but should still intentionally be smooth curves. A well-known example of this kind is the body of a vessel.

Therefore, in a variety of applications, it has become common practice to use a low-degree polynomial function (in some cases, even functions of other types, such as exponential or trigonometric functions) to describe non-regular contours of a physical object. A well-known function of this type is the B-Spline which approximates a non-regular contour. The contour or curve is derived from a control polygon (a piecewise linear function associated with the B-Spline) by means of a matrix multiplication of the control points (corner points of the control polygon) with the so-called basic functions of the B-Spline.

This will be illustrated now in more detailed manner. As an example, the B-Spline approximation has been chosen. However, it has to be noted that this selection has only been made for convenience; the present invention may be applied to other approximation techniques (e.g., the Bezier or Hermite form) as well.

In general, a B-Spline can be denoted in parametric terms as follows:

$$Q(t) = \sum_i B_i(t) P_i$$

wherein $Q(t)$ denotes the curve (contour of the B-Spline)), the $B_i(t)$ are the basic functions of the B-Spline (rational or non-rational), and the $P_i$ are the control points of the control polygon. As the Spline curve is usually a graph in two- or three-dimensional space, the above equation is a vector equation; the vectors are denoted as bold characters herein. "i" is an index running over all control points and basic functions.

In a more general case, the geometric object is a surface in space, approximated by a B-Spline surface of the notation $$Q(u,v) = \sum_{i,j} M_i(u) N_j(v) P_{ij}$$

with u,v as (independent) parameters, the basic functions $M_i(u)$ and $N_i(v)$, the control points $P_{ij}$ and the indices "i" and "j".

There are basically two ways of defining a B-Spline curve or surface. The first is to define the control points $P_i$ of the control polygon; the B-Spline curve. is then calculated from the control points according to the above equation. This way requires only few programming efforts and computing power; however, as the curve or surface is generated indirectly, the user does not have full control over the final geometry, such that several iterations may be necessary until the desired curve or surface is designed.

The second way is based on the definition of interpolation points which are located on the function (B Spline curve or surface). The B-Spline is then generated by interpolation of several B-Spline profiles. It is understood that this way is more convenient to the user, but requires higher programming effort and more computational power.

A common problem in either of these cases is the modification of already defined ("existing") B-Spline curves or surfaces (this applies also to other functions representing a geometric object). The prior art provides two solutions to this problem:

a) In case the Spline curve or surface was generated via the control points of the associated control polygon, single control points can be moved. The Spline is then rebuilt on the basis of the modified control polygon.

This kind of modification operates in quite indirect manner, i.e., the user cannot exactly predict what will happen with the curve or surface when a control point is shifted. In order words, the modified Spline will seldom meet his expectations, such that further iterations are necessary. Needless to say that this process is very time-consuming.

b) In case the Spline curve or surface was generated via interpolation of multiple Splines, it is possible to access interpolation points, or Spline profiles, directly and shift them to another location.

This process provides better control for the user, i.e., the modified Spline will meet his expectations better than in case a). However, this technique has other disadvantages.

The most serious drawback is that the modification of the Spline is not locally restricted. I.e., a modification will result in a modification of the whole Spline, instead of only a local region thereof. This effect is usually not desired. Likewise, the modified Spline will oscillate around the interpolation points.

Further, access is only possible to the interpolation points, but not to other points of the curve or surface. This limits the user's choices to modify the Spline.

The disadvantages and effects of the prior art techniques for Spline modification will be illustrated, and discussed further, in the detailed description.

Consequently, there is a need for an improved modification technique which avoids the disadvantages encountered with the prior art modification techniques, either partially or completely.

SUMMARY OF THE INVENTION

It is thus a major object of the present invention to provide a method for modifying a geometric object of the kind described above which requires only a minimum of user interaction.

According to the present invention, this problem is solved by the following steps:

identifying at least one point of origin on the geometric object, identifying a target point for replacing the point of origin, transforming the shift of the point of origin to the target point into an at least local or regional shift or modification of the at least piecewise polynomial function, defining a modified geometric object as a function of the modified piecewise polynomial function.

One basic underlying idea of the present invention is that an arbitrary point on the function itself ("point of origin") may be "picked" (identified) and shifted to another location ("target point"). The shift of the point on the function is then transformed into a (local) shift of the piecewise polynomial function, resulting in a modified polynomial function. In the last step, a new function representing the modified geometric object is defined, in dependence of the modified polynomial function.

The inventive method as described above is easy to perform—the user has simply to identify a point on the geometric object, and a target point to which this point is to be moved; i.e., the target point is intentionally a point on the new (modified) geometric object. These two simple steps require no iterative procedure; therefore, the new method is also very fast. Further, the user has full control over the modified geometry; in particular, he need not modify the geometric object indirectly, e.g. via control point shifts, but he rather defines a point directly on the modified geometric object. Therefore, the modified geometry will meet his expectations in the vast majority of cases. According to the inventive method, the shift of points located on the geometric object are internally processed as a transformation of the associated piecewise polynomial function; however, these are steps which the user will usually not notice, or at least not take care of. As the piecewise polynomial function is, in some embodiments of the CAD system, not displayed on the screen, the process is, in the user's view, a shift or modification of the geometric object itself, rather than a transformation of the associated polynomial function, despite of the fact that internal processing makes use of the characteristics and features of the polynomial function. But even in cases where the polynomial functions are displayed, the user need not take care of them. In other words, the internal transformation of the piecewise polynomial function is quasi-"invisible" and does not need user involvement.

The method according to the present invention is also easy to implement, i.e. requires only few programnning efforts, and is fast in terms of execution (CPU) time (which is a major performance criterion for interactive systems).

Another major advantage of, and an object solved by, the present invention is that the user may arbitrarily select any point of an existing (already defined) geometric object for modification. That is, he is not restricted to move or shift only the interpolation points of the object (as was the case in prior art solution b). discussed above). This allows finer "tuning" of a necessary modification (i.e., the user may directly select a point of origin representative of the modification, instead of choosing an interpolation point which is only "close" to such a point), such that an optimal. modification may be performed.

It is still another major advantage of the present invention that modifications of the geometric object are, contrary to the prior art approach, locally restricted. That is, the geometric object is, in fact, only modified as far as required, and no unwanted oscillations about interpolation points or other disadvantageous effects occur. In preferred embodiments of the present invention, the region of the geometric object subject to modification is even definable by the user, thus providing further improved control of the modification process.

It is another advantage of the present invention that smooth modified geometries are generated.

The method according to the present invention may e.g. be used to modify geometric objects such as a boundary (e.g., an edge) of a machine part (i.e., a function of the "line" type), or surfaces of a geometric object (represented by a surface-type function). It will be appreciated that it may be used to modify other geometries as well.

It is further understood that :the above advantages of the present invention also represent objects solved by it.

In a preferred embodiment, the at least piecewise polynomial function is separated by control points and comprises the step of transforming the shift of the point of origin to the target point into a (local) shift or modification of the control points. In this embodiment, processing of the at least piecewise polynomial function is particularly easy, as usually only the control points have to be processed, which in turn is easier to perform and saves computational time. (It will be noted that this concept relates to the "control polygon" approach discussed above, in case the control points are connected by a linear function). However, it will be appreciated that other techniques may be used as well, such as modification or local shift of the polynomial functions (as represented by mathematical equations) themselves, or the like.

In case the control point approach is used, it is further advantageous to shift the control points basically in the same direction; i.e., the shifts occur basically in parallel. The necessary calculations are then easier to perform, and operation is better predictable (i.e., after some experience with the CAD system, the user will have a "feeling" what will happen when requesting a specific modification).

It is possible to shift all control points for the same offset value (such that all control point shifts may be represented as vectorial moves, wherein the vectors point in the same direction, and have the same "length"). However, additionally, or alternatively, the control points may advantageously be shifted for different offsets (absolute values), preferably in parallel. This results in a smoother transition from the original (unmodified) geometric object to its modified version (which is particularly of interest at the limits or boundaries of the region of modification, where the modified geometric object approaches the original version thereof). In the detailed description, both approaches (shift of the control points for the same, or different offset values) will be shown and discussed.

In yet another advantageous embodiment of the present invention, the function representing the geometric object is given in parametric form (this is the most common form in CAD technology; however, non-parametric forms may alternatively be used as well when practicing the present invention). In this embodiment, the step of transforming the shift of the point of origin to the target point into a modification or shift of the at least piecewise polynomial function comprises the step of assigning to the geometric object at the point of origin, as well as to the modified geometric object at the target point, the same parameter value or values. This makes the subsequent mathematical processing steps easier (i.e., reveals simpler equations to be solved). It is understood that this feature may also be used if control point modification or shift is provided.

In yet another useful and advantageous embodiment of the present invention, the function representing the geometric object is a Spline function, particularly a B-Spline function. This is a representation widely used in the field of CAD art. (Other representations such as the Bezier or Hermite form may alternatively be used). The Spline representation may be used together with the above described features of the present invention, or without them.

In case a Spline function is used, the geometric object may be defined by the equation $$Q(u,v) = \sum_{i,j} M_i(u) N_j(v) P_{ij}$$

wherein u and v are the parameters, $M_i(u)$ and $N_j(v)$ are the basic functions of the Spline, the $P_{ij}$ are the control points and $Q(u,v)$ is the function defining the (original, i.e. unmodified) geometric object. Advantageously, the modified geometric object is then defined by the equation $$Q'(u,v) = \sum_{i,j} M_i(u) N_j(v) (P_{ij} + C_{ij}),$$

wherein $Q'(u,v)$ is the function representing the modified geometry, and the $C_{ij}$ are offset vectors of the control points. (The apostrophe is used to designate a modified version, not a derivative, in the context of this description).

The $C_{ij}$ represent the shift (br, in general, modification) of the control points and may be selected in dependence of the specific application. For example, they may depend on either of the following parameters (or on several of them):

The selected point on the unmodified, and/or the modified, geometric object (or the Splines representing them); and/or the Spline functions themselves; and/or the parameter value of the selected point(s) of the unmodified, and/or the modified, geometric object (or the Splines representing them); and/or form or contour parameters arbitrarily selectable by the user, such form or contour-parameters defining the shape, and the local extent, of Spline modification.

In a specific and preferred embodiment, the offset vectors $C_{ij}$ are selected according to the following equation:

$$C_{ij} = \Delta \cdot M_i(u_0) \cdot N_j(v_0),$$

wherein $u_0$ and $v_0$ are the parameter values of the point of origin and $\Delta$ is defined as $$\Delta = \frac{P' - P}{\sum_i M_i^2(u_0) \cdot \sum_i N_i^2(v_0)}.$$

P is the point of origin, and P' is the target point.

In this embodiment, the control points are moved in the same direction. The mathematical details, and in particular the role of $\Delta$ and its calculation, will be discussed in the detailed description.

Please note that only the control points are subject to modification herein—the basic functions of the B-Spline are not changed.

The above discussed cases relating to Spline functions involve two sets of Splines, namely $M_i(u)$ and $N_j(v)$. This is a more general "two-parameter" case wherein the Splines are Spline surfaces, rather than "one-parameter" Spline functions. The "one-parameter" case is more specific and may be obtained by setting the $N_j(v)$'s, as well as v itself, to zero and ignoring the index j.

Some embodiments of the "one-parameter" case will now be discussed in greater detail. The equation for the Spline defining the unmodified geometric object is then simplified to $$Q(t) = \sum_i B_i(t) P_i$$

wherein "t" is the (independent) parameter, the $B_i(t)$'s are the Spline functions and the $P_i$ are the control points. The modified geometric object is then defined by the equation $$Q'(t) = \sum_i B_i(t) (P_i + C_i)$$

with the $C_i$'s as offset vectors of the control points.

In similar manner as described above, a shift of the control points in the same direction may be obtained by defining the offset vectors as follows:

$$C_i = \Delta \cdot B_i(t_o),$$

wherein $t_0$ is the parameter value of the point of origin and $\Delta$ is defined as $$\Delta = \frac{P' - P}{\sum_i B_i^2(t_0)}$$

In some applications, it may be desirable to use form parameters which define the shift or modification of the control points. According to a preferred embodiment of the present invention, such form parameters may be introduced by defining the offset vectors $C_i$ as follows:

$$C_i = \sum_{j=0}^{n-1} \gamma_{i-j} B_j(t_0) \cdot \Delta$$

wherein the $\gamma_i$ are the form parameters and $\Delta$ is defined as $$\Delta = \frac{P' - P}{\sum_{i,j} B_i(t_0) \cdot \gamma_{i-j} \cdot B_j(t_0)}$$

Specific examples of the form parameters will be disclosed in the detailed description. It is understood that the form parameter concept, although specifically discussed in the context of the "one-parameter" case herein, may also be applied to "two-" or even "multi-parameter" cases (e.g. Spline surfaces).

In several applications, it may further be desirable to define not only the modification of the geometric object, but also the kind of modification (i.e., the desired shape of the modified geometric object) further. The present invention provides an advantageous embodiment to achieve this goal. The preferred solution disclosed herein proposes to specify not only the point of origin (unmodified geometric object) and the target point (modified geometric object), but also the derivative(s) at the target point.

If we limit our consideration for the moment to the first derivative of the Splines representing the unmodified and the modified geometric objects, the following definition for the offset vectors $C_i$ may be made:

$$C_i = \Delta_0 \cdot B_i(t_0) + \Delta_1 \cdot dB_i(t_0)dt.$$

$t_0$ is the parameter value at the point of origin (and at the target point as well, if the same parameter representation is used). It can further be shown that $\Delta_0$ and $\Delta_1$ may be obtained as solutions of the matrix equation $$\begin{pmatrix} \sum_i B_i^2(t_0) & \sum_i B_i(t_0)dB_i(t_0)/dt \\ \sum_i dB_i(t_0)/dt \cdot B_i(t_0) & \sum_i (dB_i(t_0)/dt)^2 \end{pmatrix} \begin{pmatrix} \Delta_0 \\ \Delta_1 \end{pmatrix} = \begin{pmatrix} Q'(t_0) - Q(t_0) \\ dQ'(t_0)/dt - dQ(t_0)/dt \end{pmatrix}$$

As will be shown in more detail in the detailed description and the drawings, such specification of the first derivative allows arbitrary "shaping" of the resulting geometry.

It is, of course, possible to extend the above concept to higher order derivatives (but the mathematical background, and the matrix equations, will then become more extensive and difficult, such that they will not specifically be discussed here). Further, the derivative concept may be extended to "multi-parameter" cases as well.

The above method steps may be performed in any suitable manner. In order to identify the point of origin, as well as the target point, it is convenient and advantageous to move a cursor on a graphics screen and click a mouse, operate a light pen or the like to "click on", i.e. identify, them (however, there are also other possibilities like keyboard entry or the like). The parameters (e.g., the $\Delta$ values) of the modified object are then calculated and stored and/or displayed. In an additional step, the limits of a region of the function (e.g., a Spline) defining the geometric object which is intentionally subject to local modification may be entered, for example on a scale displayed on a graphics screen or via a keyboard.

The invention also relates to a computer aided design system comprising a central processing unit, a user input interface, a display, and a B-Spline processor. The B-Spline processor includes a B-Spline curve manager, a control polygon manager and a modification manager, said modification manager comprising a $\Delta$ processor for calculating the parameters of a modified B-Spline function in dependence of the control polygon relating to an original B-Spline function; that is, the computer aided design system is basically designed to provide the method steps disclosed above. For the purpose of defining the desired region of modification, the computer aided design system may further advantageously comprise a region handler for entering the region of the original B-Spline function subject to local modification.

It is understood and expressly noted that the present invention relates to all useful combinations of the above disclosed features, whether alone or in any other or arbitrary combination.

BRIEF DESCRIPTION OF THE DRAWINGS

The invention will now be explained, by means of a non-limiting example, with reference to the accompanying drawings, in which.

DETAILED DESCRIPTION OF THE PREFERRED EMBODIMENTS

Figure 1:
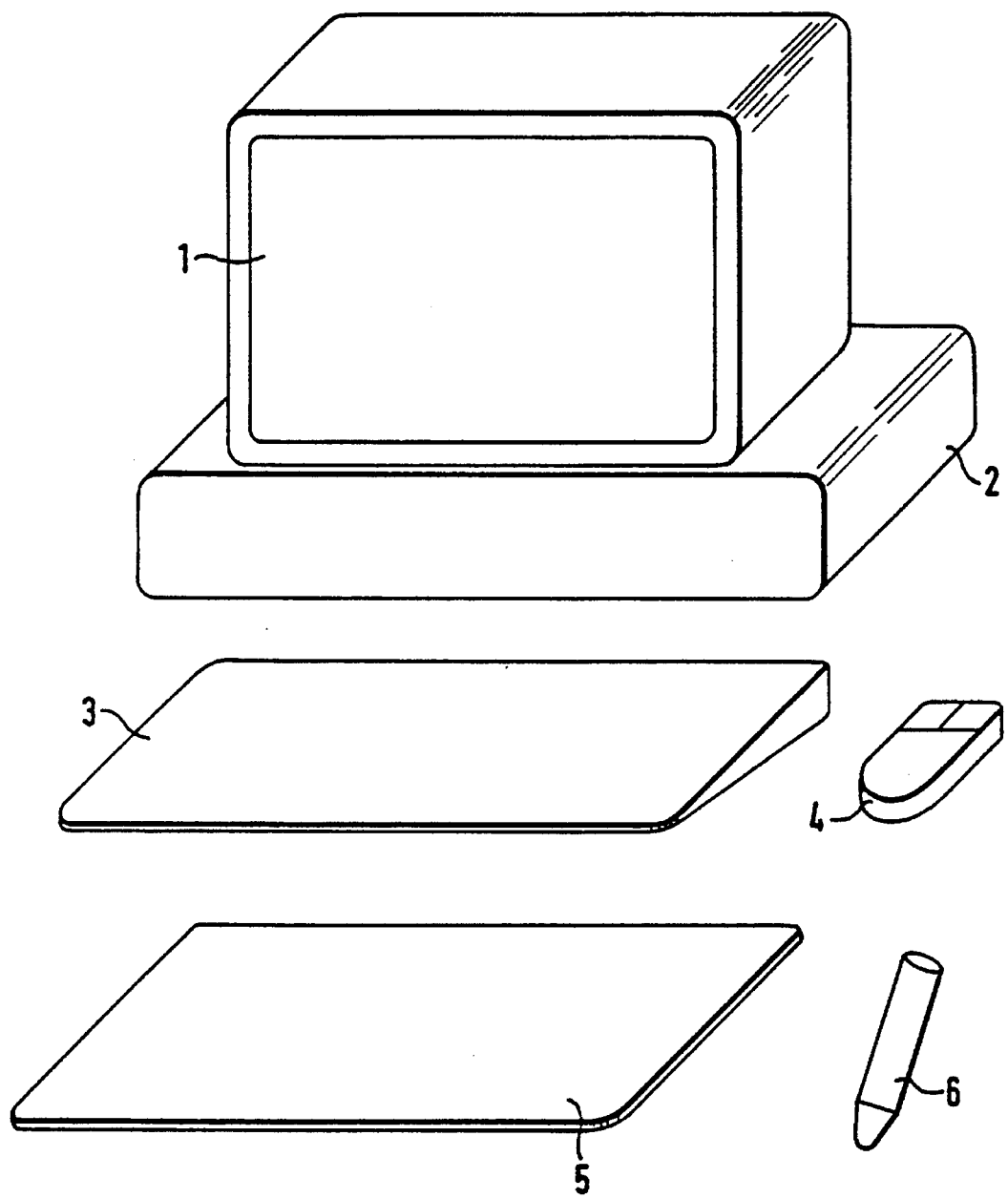
FIG. 1 depicts the components of a CAD system.

FIG. 1 depicts the basic elements of a computer aided design (CAD) system. Such CAD systems are known in the art.

A screen or display 1, typically a cathode ray tube, is used to display the geometry which is created and edited by the user. Such geometry may e.g. represent mechanical parts, electronic circuits boards, integrated circuits or the like. For the purposes of this description, it will be assumed that a mechanical part, like a cast-steel part, is being edited. The screen 1 may show a single or various views of the casting, either in 2- or in 3-dimensional representation. For example, a 3-dimensional perspective view may be shown, together with a 2-dimensional top view, and a 2-dimensional side view.

A mainframe unit 2, e.g., a microcomputer or a workstation, controls operation of screen 1. The mainframe unit contains a microprocessor or another central processing unit (CPU), memories and all associated electronics. The user may communicate with the mainframe unit 2 (e.g., send commands) via a multiplicity of input devices, some of which are shown—as exemplary examples—in FIG. 1, namely a keyboard 3, a computer mouse 4, and a graphics tablet 5 with associated light pen 6. The interconnection of these components is known by those skilled in the art and not specifically drawn in FIG. 1. Also not shown are further components of known CAD systems, like a punch for producing punch tapes for numerically controlled machine tools.

A common problem encountered with such CAD systems is the generation of smooth curves, or in general, a smooth geometry. A technique known in the art to solve this problem is the approximation of the final curve by means of polynomials, e.g., of the second or third order. Specifically, Splines (in particular, B-Splines), i.e., piecewise polynomial or even linear functions, can be used to approximate the final curve. Although the following description relates specifically to B-Splines, it is understood that the underlying principles may also be applied to other approximation techniques, e.g., the Hermite or the Bezier technique.

The basics of the B-Spline representation, insofar as of importance for the present invention, will now be explained with reference to FIG. 2.

Figure 2:
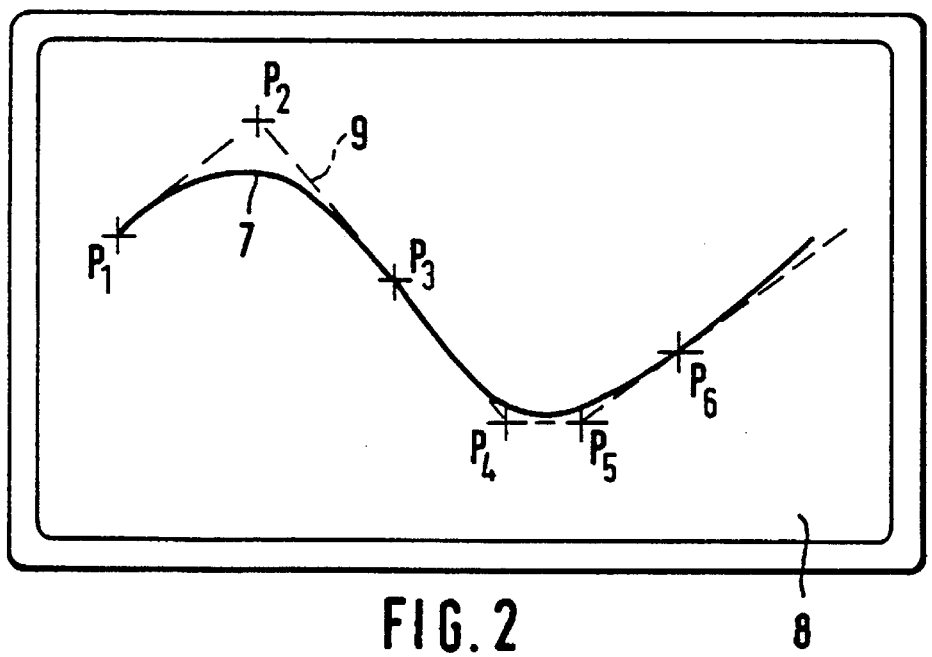
FIG. 2 depicts a very simple example of a B-Spline curve, together with the associated control polygon.

FIG. 2 depicts a curve 7 as e.g. displayed on the screen 8 of a CAD display. (The curve may e.g. be part, such as a boundary, of a mechanical part). A corresponding control polygon (piecewise linear function) is denoted as 9 in clotted lines (The control polygon is usually not shown in the screen, but has been drawn in FIG. 2, in order to increase understanding of the underlying concept). The points (control points) on the control polygon are denoted as $P_1, P_2 \ldots, P_n$ (here $P_1$ to $P_6$). The curve is defined by the points or "corners" $P_m$ of the control polygon via the following vector equation:

$$Q(t) = \sum_i B_i(t) P_i \quad (1)$$

wherein Q(t) is the curve 7, the $B_i(t)$'s are the Spline functions (e.g., the B-Spline functions), and the $P_i$'s are the corner points of the control polygon 9. (Bold characters are used herein to denote vectors). The $B_i(t)$'s may e.g. be rational B-Splines, or non-uniform rational B-Splines of the general form $$B_i(t) = \frac{w_i N_i(t)}{\sum_i w_i N_i(t)}, \quad \sum_i w_i = 1$$

It will be noted that the above equation is written in parametric form, as is usual in the technique of Splines. The independent variable is the parameter t. Therefore, the above equation (1) is a vector equation. For example, in the three-dimensional case, Q(t) could be rewritten as $$Q(t) = \begin{pmatrix} Q_x(t) \\ Q_y(t) \\ Q_z(t) \end{pmatrix} \quad (2)$$

It can thus be seen that every coordinate of the curve 7 is defined by the corner points $P_m$ of the control polygon 9. It is understood that the use of a control polygon, i.e., a piecewise linear function, is not mandatory; instead, piecewise, polynomial functions of higher order could be used as well.

There are basically two ways of defining a curve. The first is to specify the points of the control polygon; the curve will then be generated according to eq. (1). The second way is to define single points (interpolation points) on the curve itself. The CAD system will then interpolate between these points by setting up the appropriate control polygon. Usually, CAD systems support both ways of curve definition.

A common problem encountered in CAD technology is the modification of an already defined Spline curve. Dependent on the way the curve was originally generated, there are also two ways of implementing changes:

a) in case the curve was generated via the control polygon, single control points may be moved.

It will be appreciated that this is a quite indirect way of modifying the curve. That is, the generated curve will seldom exactly meet the specifications required. In contrast, there will always be some differences requiring further user interaction, thus resulting in a process of "successive approximation". This is a cumbersome and time- consuming way of performing changes.

Figure 3:
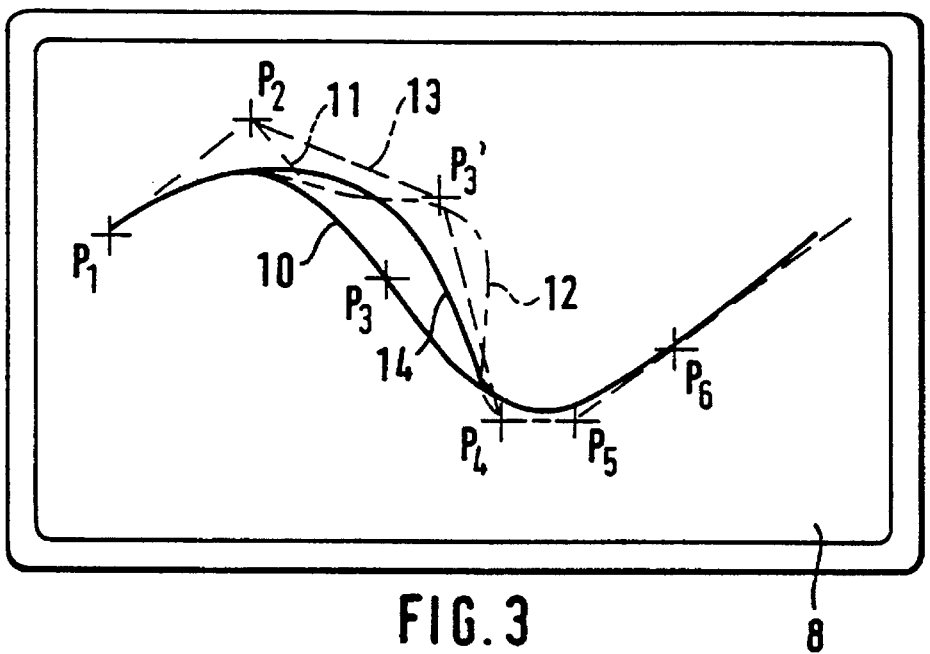
FIG. 3 illustrates the drawbacks of the prior art when the control polygon is modified.

The drawbacks encountered with this prior art approach are illustrated in FIG. 3. Assume it is intended to modify the original Spline curve 10 (the associated control polygon is denoted as 11) such that it takes the shape of modified Spline curve 12. For this purpose, control point $P_3$ is picked and moved to a new location $P_3'$. However, the resulting Spline curve is curve number 14 (the associated control polygon being labelled as 13) which still does not coincide with the intended Spline curve 12. Therefore, further modifications, i.e., movements of control points, have to be made until Spline curve 12 is approximated. It can been seen that is a time-wasting iterative process.

b) In case the curve was generated by interpolation of various Spline profiles, the single profiles can be modified. That is, the interpolation points of the curve are directly accessed. It will be appreciated that this is a process which needs a lot of CPU time, and complex programs. But even worse: This kind of curve modification is usually not locally restricted and thus leads to undulation (i.e., oscillation) around the interpolation points. In other words, the whole curve is modified, in contrast to only local modifications (which are usually desired).

Figure 4:
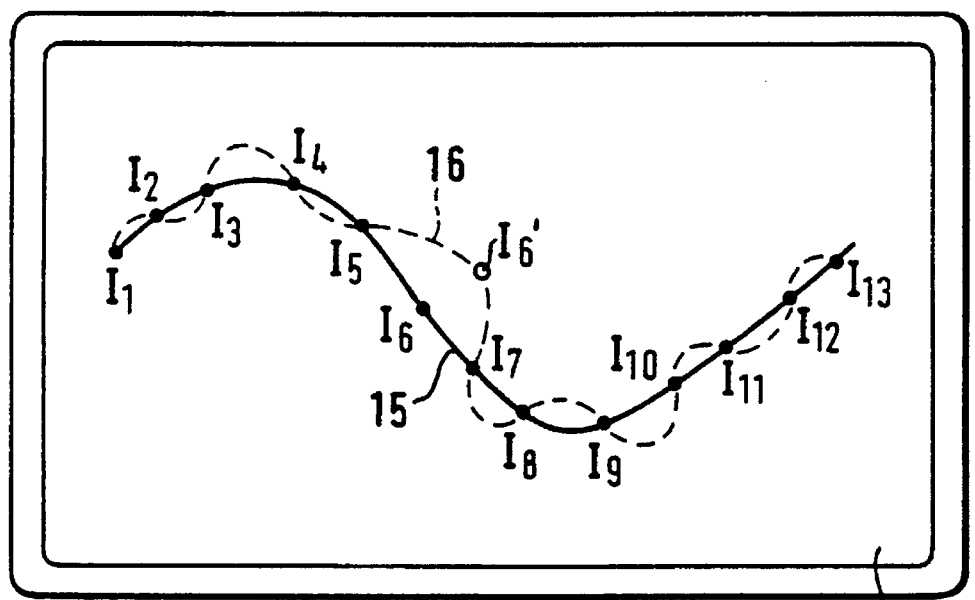
FIG. 4 illustrates the drawbacks of another prior art approach, namely the modification of interpolation points of the Spline curve.

This effect is illustrated in FIG. 4. The original Spline is denoted as 15 and its interpolation points as $I_1, I_2, \ldots, I_{13}$. If interpolation point $I_6$ is moved to a new position $I_6'$, in order to achieve a similar modified Spline as shown by ref. no. 12 in FIG. 3, the resulting Spline will oscillate around the interpolation points, as shown by modified Spline 16 in FIG. 4. Further, FIG. 4 also shows that the modification of the Spline is not locally restricted, an effect which is usually undesirable.

The present invention avoids the disadvantages of both techniques by a novel approach wherein the modifications of the curve are achieved by direct access to the Spline curve, i.e., the user may pick a point directly on the curve (not on the control polygon), but the necessary changes or modifications still remain locally restricted.

This concept will now be explained with reference to FIG. 5.

Assume a Spline curve 17 has been drawn. Reference number 18 relates to the respective control polygon.

The user wants now to move an arbitrary point P (on the Spline curve, i.e., unrelated to the control points of the control polygon; P' further needs not to coincide with any interpolation point of the Spline curve) to another point P'.

However, the Spline curve itself should only be modified in a certain limited region.

Figure 5:
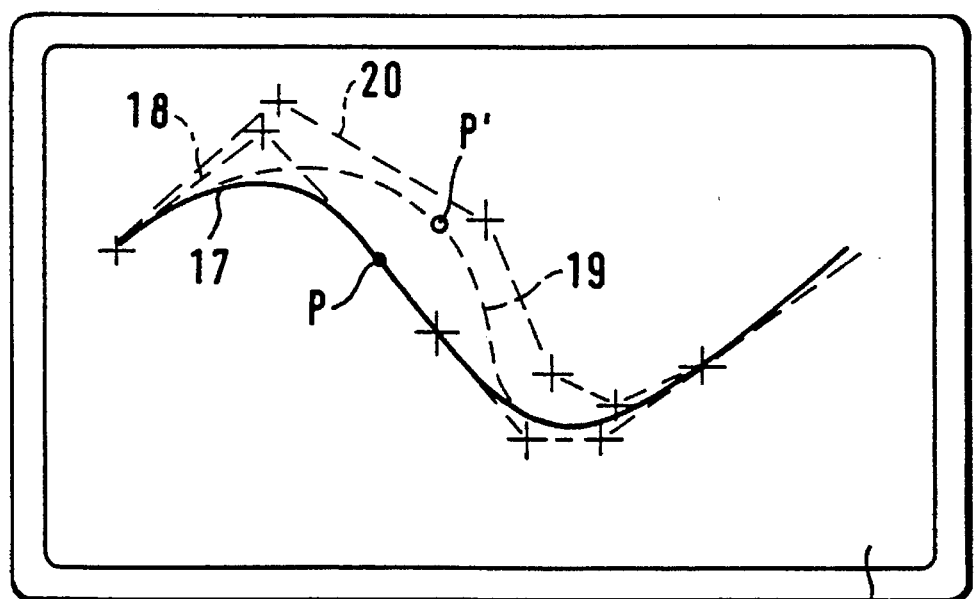
FIG. 5 depicts the basic concept of the present invention.

After definition of points P and P', the CAD system determines the value, of the parameter t, namely $t_0$, relating to point P; i.e., $P=Q(t_0)$ (that is, the parameter value $t_0$ is not specified by the user, but rather calculated by the system). Modified point P' is defined as having the same parameter value, i.e., $P'=Q'(t_0)$. The new (modified) Spline curve is now given by $$Q'(t) = \sum_i B_i(t) (P_i + \Delta \cdot B_i(t_0)) \qquad (3)$$

wherein $\Delta$ is defined as $$\Delta = \frac{P' - P}{\sum_i B_i^2(t_0)} \qquad (4)$$

and the modified Spline curve is appropriately calculated (and displayed), as shown by reference number 19 (dotted line) in FIG. 5. In particular, FIG. 5 depicts that the modification is locally restricted. User interaction is also very easy, as only a point P on the Spline curve, and a "target" point P', have to be defined.

As eq. (3) shows, the control polygon, i.e., the control points, are also modified. That is, the set of original control points $P_i$ is replaced by a set of revised control points ($P_i+\Delta \cdot B_i(t_0)$). The modified control polygon has been denoted as 20 in FIG. 5. It can be seen that the control polygon is also only locally modified.

The above-described process is based on the idea to "transform" the displacement of the Spline curve into a set of control point displacements.

In interactive CAD systems, a convenient method for Spline modification may e.g. comprise the steps of picking a point on the Spline with an (e.g. mouse-driven) cursor and moving the cursor to another location of the screen, wherein the resulting modified Spline curve is quasi-instantaneously displayed on the screen. In case the modified Spline does not meet the user's expectations, he may then move the cursor further, until a final cursor position is reached with an associated modified Spline which meets his needs.

The validity of the above equation (4) can be shown as follows:

Assume the modified Spline curve is defined by eq. (3), i.e.

$$Q'(t) = \sum_i B_i(t) (P_i + \Delta \cdot B_i(t_0))$$

Thus, the definition of point P' on the modified Spline is as follows:

$$P' = Q'(t_0) = \sum_i B_i(t_0) (P_i + \Delta \cdot B_i(t_0)) \qquad (5)$$

For point P on the original Spline, we have the following equation:

$$P = Q(t_0) = \sum_i B_i(t_0) P_i \qquad (6)$$

If we subtract eq. (6) from eq. (5) (which is possible as the parameter values $t_0$ are equal for both equations), we obtain $$P' - P = \sum_i \Delta \cdot B_i^2(t_0) = \Delta \cdot \sum_i B_i^2(t_0) \qquad (7)$$

Solution of eq. (7) according to $\Delta$ directly reveals eq. (4).

The generated modified Spline curve Q'(t) passes through point P', at a parameter value of $t=t_0$. Q'(t) is only locally different from original Spline curve Q(t), as a comparison between reference numbers 17 and 19 reveals. The reason therefor is that only k basic functions $B_i$ are different from zero at $t_0$, wherein k is the order of the Spline.

Figure 6:
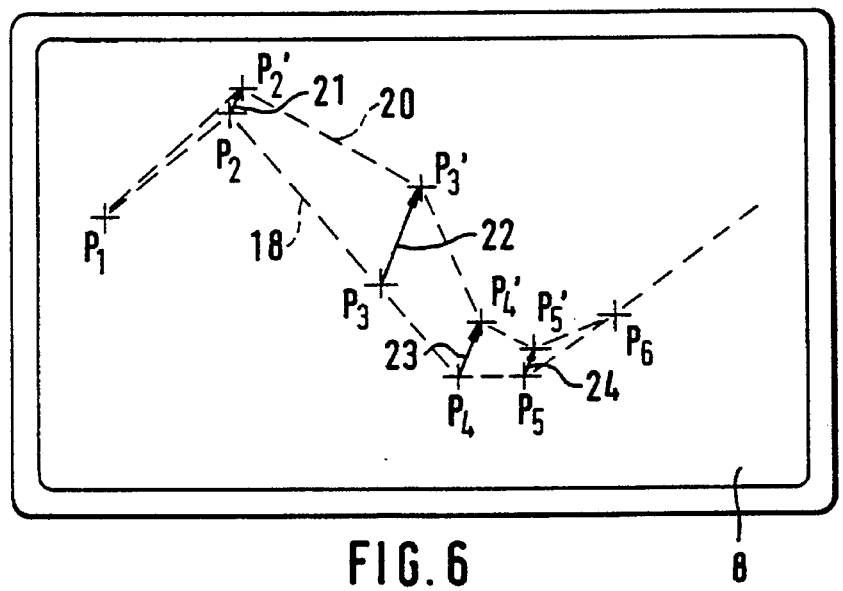
FIG. 6 shows the control polygons of an original and a modified Spline curve according to the present invention, including the vectorial movements of the control points, but—for ease of illustration—without the associated Spline curves.

FIG. 6 depicts the underlying concept. In this drawing, the control polygons 18 (=control polygon of original Spline curve) and 20 (=control polygon of modified Spline curve) of FIG. 5 have been redrawn (the Spline curves themselves have been omitted, but only for the purpose of better understanding; the drawing of FIG. 6 will effectively not appear on the screen of an actual CAD system). The control points of control polygon 18 have been denoted as $P_1, P_2, \ldots, P_6$ (these points are not related to P, P'), and the control points of control polygon 20 have likewise been denoted as $P_2', P_3', P_4'$ and $P_5'$.

It can be seen that the initial movement or relocation of a point P on the original Spline curve to a point P' on the modified Spline (not shown in FIG. 6) is transformed into a parallel shift of the control points. Vectors 21–24 illustrate movement of control points $P_2, P_3, P_4$ and $P_5$ into modified control points $P_2', P_3', P_4'$ and $P_5'$, wherein all vectors point in the same direction, but for a different amount or offset. It will also be noted that only a limited number of control points (corresponding to locally limited Spline modification) are moved; e.g., $P_1$ and $P_6$ have not been moved and are thus part of both control polygons. Therefore, Spline curve modification may be described as vectorial movement of the control points in a certain region, wherein the vectors have different length, but still basically the same direction. By the way, the parallel shift of the control points as described above is a feature of a preferred embodiment, but by no means a necessary prerequisite for practicing the present invention, as will be discussed below. That is, there are also ways wherein the control points may be shifted in a non-parallel manner.

In the above example, it has been assumed that the modified Spline curve Q'(t) is defined by the equation $$Q'(t) = \sum_i B_i(t)(P_i + \Delta \cdot B_i(t_0)),$$

see eq. (3) above, This is a quite specific assumption which may be extended by the more general statement $$Q'(t) = \sum_i B_i(t)(P_i + C_i) \qquad (8)$$

wherein the $C_i$ are, in general, offset vectors. The $C_i$ may be functions of, or dependent of, the following quantities:

a) Point P and/or point P', i.e., $C_i=f(P,P')$; and/or b) the Spline functions $B_i(t)$, i.e., $C_i=f(B_i(t))$, or $C_i=f(B_j(t))$, i≠j; and/or c) the parameter value $t_0$ of Q(t) at point P, or. of Q'(t) at point P', i.e., $C_i=f(t_0)$; and/or d) form or contour parameters arbitrarily selectable by the user, such form or contour parameters defining the shape, and the local extent, of Spline modification.

A specific example of the generalization defined above will now be discussed.

Let $B_0, B_1, \ldots, B_{n-1}$ be the basic functions of the Spline Q(t). Form parameters are defined as $\gamma_{-n+1}, \ldots, \gamma_{n-1}$, wherein $\gamma_0>0$ and $\gamma_j \geq 0$.

We chose now $$C_i = \sum_{j=0}^{n-1} \gamma_{i-j} B_j(t_0) \cdot \Delta \qquad (9)$$

as the offset vectors in eq. (8), such that $$Q'(t) = \sum_i^z B_i(t) \left( P_i + \sum_{j=0}^{n-1} \gamma_{i-j} B_j(t_0) \cdot \Delta \right) \qquad (10)$$

$\Delta$ may be determined, in similar manner as above, from the following equations:

$$P' = Q'(t_0) = \sum_i B_i(t_0) \left( P_i + \Delta \sum_{j=0}^{n-1} \gamma_{i-j} B_j(t_0) \right) \qquad (11)$$

and $$P = Q(t_0) = \sum_i B_i(t_0) P_i \qquad (12)$$

Subtraction of these equations reveals $$\Delta = \frac{P' - P}{\sum_{i,j} B_i(t_0) \cdot \gamma_{i-j} \cdot B_j(t_0)} \qquad (13)$$

It will be noted that the form parameters $\gamma_j$ run only from $(-n+1)$ to $(n-1)$ in the above example. Outside of these limits, i.e., for $j<(-n+1)$ and for $j>(n-1)$, they are not defined (or, what is the same, equal to zero).

If we selected $\gamma_j=1$ for all $j$, the complete Spline would be shifted (but this is usually not the goal of the modification process). $\gamma_j=\delta_{j0}$ ($\delta$ being the Kronecker symbol) reveals the first example in this description.

Figure 7A:
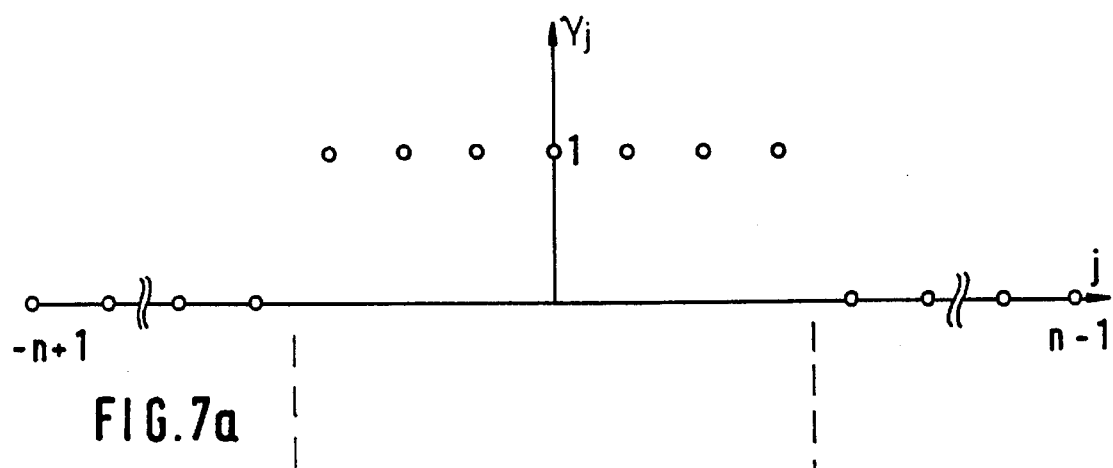
FIG. 7a depicts a sequence of form parameters $\gamma_j$.
Figure 7B:
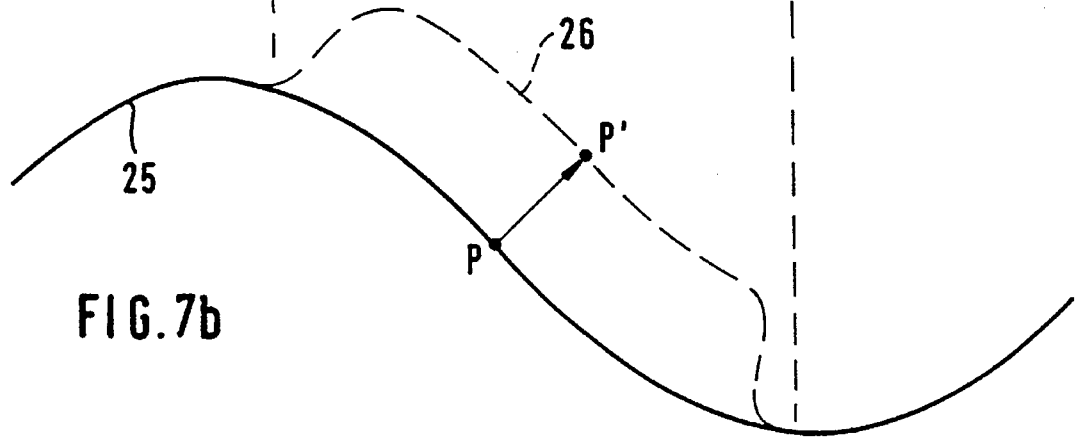
FIG. 7b shows the associated Splines, FIG. 8 relates to another embodiment of the present invention, wherein the derivative of a point on the Spline curve is specified as well.

Another specific selection of the $\gamma_j$'s is $\gamma_j=1$ for at least $k$ adjacent or contiguous $\gamma_j$'s (wherein $k$ denotes the order of the Spline). This operation is depicted in FIGS. 7a and 7b. FIG. 7a shows the sequence of the $\gamma_j$'s, and FIG. 7b depicts the original Spline Q(t) 25, as well as the modified Spline Q'(t) 26. It will be noted that the result of the operation is that a part of the Spline is shifted locally, but still keeps its original shape or contour.

It is understood that, in a more sophisticated embodiment, the $\gamma_j$'s may also be defined in different manner (i.e., not all equal to one) between $(-n+1)<j<(n-1)$, in order to obtain a more smooth transition from Spline Q(t) to Spline Q'(t).

It is an important aspect of the above example that the Spline is only modified locally. It will also be noted that, by definition of the $\gamma_j$'s (specifically, the regions where the $\gamma_j$'s are not equal to zero), the region of Spline Q(t) subject to modification can be changed or adapted. In other words, there is the possibility of adapting the part of the Spline subject to modification according to the specific needs of an application. Such adaptation may also be performed by the user.

Some aspects of such adaptation of the Spline region subject to modification will be discussed now in greater detail.

In the above example, the region subject to modification is defined by a) The indices $j$ for which the equation $\gamma_j \neq 0$ is valid;

b) the indices $i$ for which the equation $B_i(t_0) \neq 0$ is valid.

Specifically, let $t_0$ be the parameter value of point P on Spline Q(t); i.e., $P=Q(t_0)$. Assume further that $B_{i_0}(t_0), \ldots, B_{i_1}(t_0) \neq 0$ and $\gamma_{j_0}, \ldots, \gamma_{j_1} \neq 0$.

Under these assumptions, the control points with the following indices $i$:

$i_0+j_0 \leq i \leq i_1+j_1$ are subject to modification. If we regard the related region in the parameter domain, this implies a modification in the region $[\xi_{i_0+j_0}, \xi_{i_1+j_1 k}] \qquad (14)$ wherein $(\xi_i)_{i=0}^{n+k-1} \qquad (15)$ is the nodal vector of the Spline, and $k$ is its order.

In this example, the region of necessary Spline modification results from the used form parameters. However, in practical applications, it is often desired to have the region of modification—hereinafter called $[t_{min}, t_{max}]$—defined by the user. This is possible if the form parameters $\gamma_j$ are defined such that $[\xi_{i_0+j_0}, \xi_{i_1+j_1+k}] \subseteq [t_{min}, t_{max}]$ Additional knots may be introduced therefor.

Remark: The above equation (14) is not strongly valid in borderline cases. For these cases, the following more complex equation has to be used:

$$\begin{pmatrix} (\xi_{i_0+j_0}, \epsilon_{i_1+j_1+k}) & \text{in case} & \xi_{i_0+j_0} < \xi_{i_0+j_0+k-1} & \text{and} \\ & & \xi_{i_1+j_1+1} < \xi_{i_1+j_1+k} & \\ [\xi_{i_0+j_0}, \epsilon_{i_1+j_1+k}) & \text{in case} & \xi_{i_0+j_0} = \xi_{i_0+j_0+k-1} & \\ (\xi_{i_0+j_0}, \epsilon_{i_1+j_1+k}] & \text{in case} & \xi_{i_1+j_1+1} = \xi_{i_1+j_1+k} & \end{pmatrix}$$

The above considerations may be expanded in that not only a new point P' may be defined (instead of P), but also the derivative of the Spline at P'. The derivative of Q'(t) at point P' will be designated as E' herein, i.e., $$E' = \frac{dP'}{dt}$$

Likewise, $$E = \frac{dP}{dt}$$

We make now the assumption $$Q'(t) = \sum_i B_i(t)(P_i + \Delta_0 \cdot B_i(t_0) + \Delta_1 \cdot dB_i(t_0)/dt) \qquad (16)$$

for a modified Spline which
passes through point P' at $t=t_0$
has the derivative E' at point P'
is only locally different from original Spline Q(t).

In analogous form as described above, $\Delta_0$ and $\Delta_1$ may be calculated as solutions of the equation system $$A \begin{pmatrix} \Delta_0 \\ \Delta_1 \end{pmatrix} = \begin{pmatrix} P' - P \\ E' - E \end{pmatrix} \qquad (17)$$

wherein $P=Q(t_0)$, $P'=Q'(t_0)$, $E=dQ(t_0)/dt$ and $E'=dQ'(t_0)/dt$. Matrix A is defined as $$A = \begin{pmatrix} \sum_i B_i^2(t_0) & \sum_i B_i(t_0) dB_i(t_0)/dt \\ \sum_i dB_i(t_0)/dt \cdot B_i(t_0) & \sum_i (dB_i(t_0)/dt)^2 \end{pmatrix} \qquad (18)$$

It can be shown mathematically that matrix A can be inverted for all Splines of the order equal to or greater 2 ($k \geq 2$ wherein $k$=order of the Spline).

Figure 8:
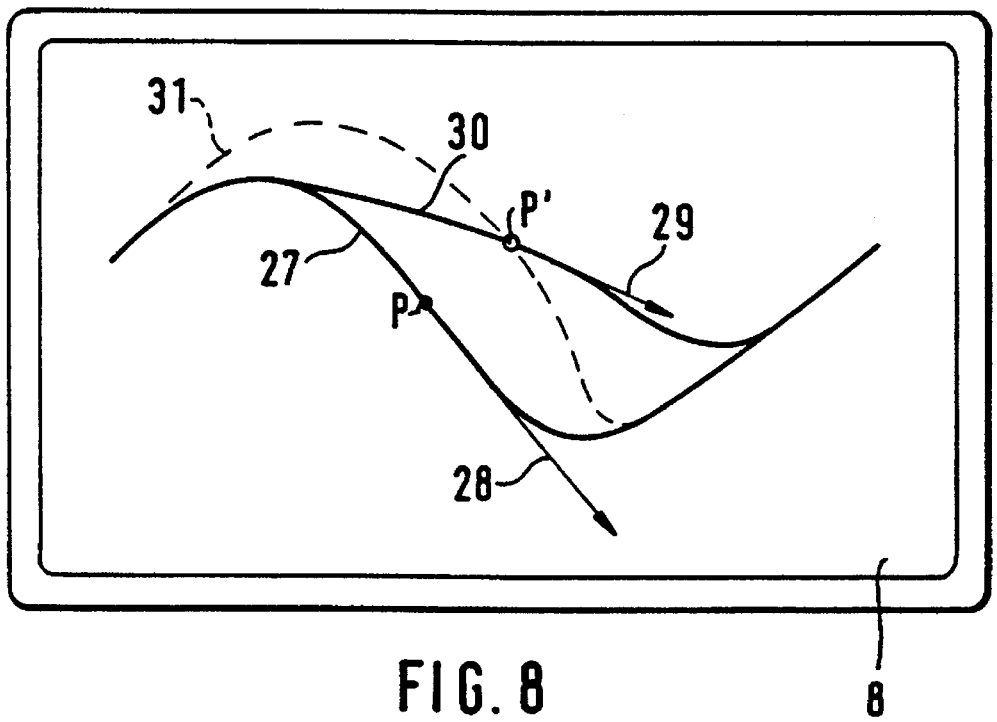

The effect of the possibility to define the derivative at point P' is illustrated in FIG. 8. The original Spline curve is denoted as 27. Vector 28 indicates the (first) derivative E at point P. (The control polygon has not been drawn in this figure.)

Point P is now moved to P'. At the same point in time, the derivative E' at point P' is defined, as indicated by vector 29. The resulting modified Spline curve is labelled as 30.

It can easily be seen that the shape of modified Spline curve 30 is different from a modified Spline curve generated without definition of the derivative at point P' (the latter curve is shown in dotted lines and referred to as 31). Thus, by defining the derivative at the modified curve point, it is possible to adapt the shape of the modified Spline curve widely to the needs of a specific case.

The above embodiment may by extended to higher order derivatives as well. Without going in too much detail, in an embodiment designed for first and second order derivatives, matrix A would be of the form $$A = \begin{pmatrix} \sum_i B_i^2(t_0) & \sum_i B_i(t_0) \cdot dB_i(t_0)/dt & \sum_i B_i(t_0) \cdot d^2B_i(t_0)/dt^2 \\ \sum_i dB_i(t_0)/dt \cdot B_i(t_0) & \sum_i (dB_i(t_0))^2 & \sum_i dB_i(t_0)/dt \cdot d^2B_i(t_0)/dt^2 \\ \sum_i d^2B_i(t_0)/dt^2 \cdot B_i(t_0) & \sum_i d^2B_i(t_0)/dt^2 \cdot dB_i(t_0)/dt & \sum_i d^2B_i(t_0)/dt^2 \end{pmatrix}$$

In another embodiment, there may be areas or surfaces defined by Splines, i.e. Splines defined by two independent parameters u,v (instead of the single parameter t used in the above examples). In geometrical terms, such Splines define a surface in 3-dimensional space.

Figure 9A:
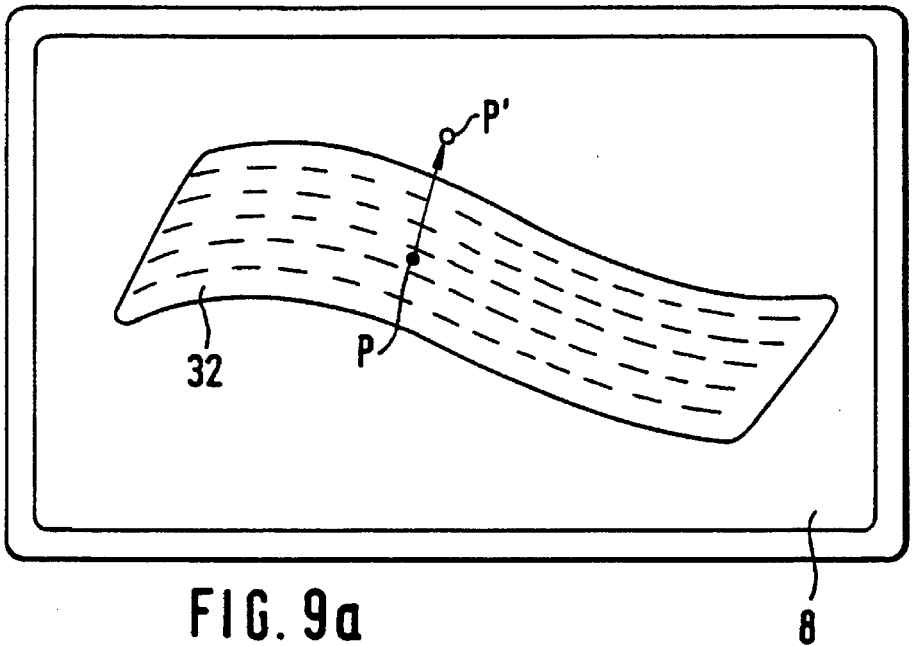
FIGS. 9a and 9b depict an embodiment of the present invention with a Spline surface.
Figure 9B:
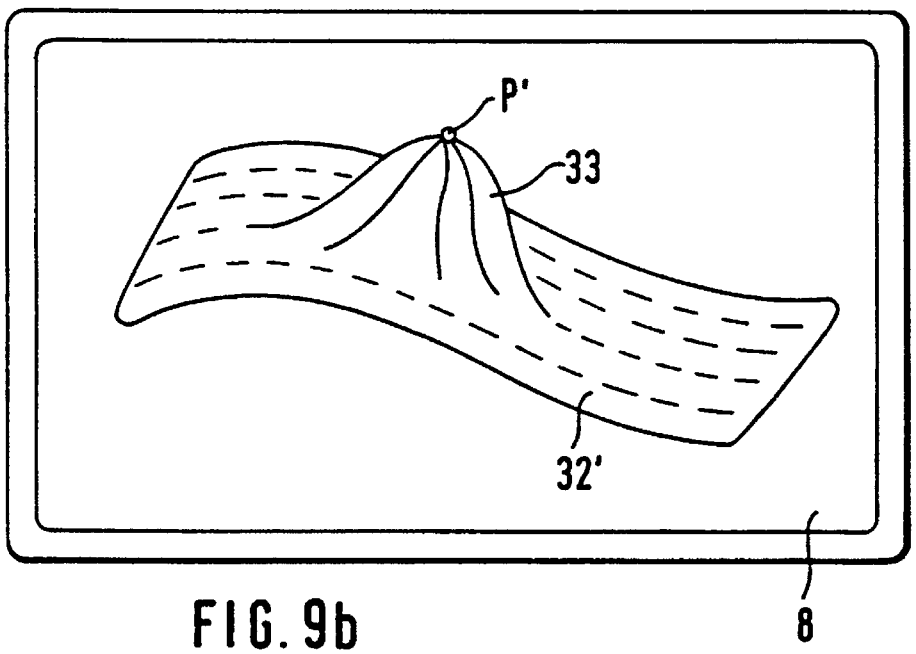

As in the case of single-parameter Splines, it may be desired to modify such a surface locally by simply "picking" a point of the surface and moving it to another location. This process is illustrated in FIGS. 9a and 9b. The original Spline surface is labelled as 32 in FIG. 9a. It is intended to move a point P on the original Spline surface to another location P', such that the Spline surface passes point P', but still is only locally modified. The result of this process is depicted in FIG. 9b. The modified Spline surface 32' has been locally modified by the additional structure 33 which passes through P'.

It will be shown now how the method according to the present invention may be used to modify a Spline surface according to these demands.

Assume the Spline surface is given as $$Q(u,v) = \sum_{i,j} M_i(u)N_j(v)P_{ij} \tag{19}$$

with u and v as parameters.

A point $P = Q(u_0, v_0)$ is to be moved to another point $P' = Q'(u_0, v_0)$ (Note that, as in the previous examples, points P and P' have the same parameter values. In the previous examples, this parameter value was $t_0$, which has been replaced by $u_0, v_0$ now, as this is a two-parameter case). We make now the assumption $$Q'(u,v) = \sum_{i,j} M_i(u)N_j(v)(P_{ij} + \Delta \cdot M_i(u_0) \cdot N_j(v_0)) \tag{20}$$

for the modified Spline surface. In similar manner as for the Spline function with only one independent parameter, we obtain at $u=u_0$ and $v=v_0$ for the modified Spline surface $$P' = Q'(u_0, v_0) = \sum_{i,j} M_i(u_0)N_j(v_0)(P_{ij} + \Delta \cdot M_i(u_0) \cdot N_j(v_0)) \tag{21}$$

and for the original Spline surface $$P = Q(u_0, v_0) = \sum_{i,j} M_i(u_0)N_j(v_0)P_{ij} \tag{22}$$

Subtraction of eqs. (21) and (22) reveals $$P' - P = \Delta \cdot \sum_i M_i^2(u_0) \cdot \sum_i N_i^2(v_0) \tag{23}$$

such that $$\Delta = \frac{P' - P}{\sum_i M_i^2(u_0) \cdot \sum_i N_i^2(v_0)} \tag{24}$$

The modified Spline surface according to eq. (20), with the definition of Δ given in eq. (24), reveals a Spline surface Q'(u,v) which passes through point P', i.e., $P' = Q'(u_0, v_0)$ is only locally different from the original Spline Q(u,v).

It is understood that the above concept may be extended to multi-dimensional Spline functions in the same manner as it has already been illustrated, e.g. by the introduction of form parameters. The general equation for arbitrary form parameters $C_{ij}$ is $$Q'(u,v) = \sum_{i,j} M_i(u)N_j(v)(P_{ij} + C_{ij}) \tag{25}$$

Figure 10:
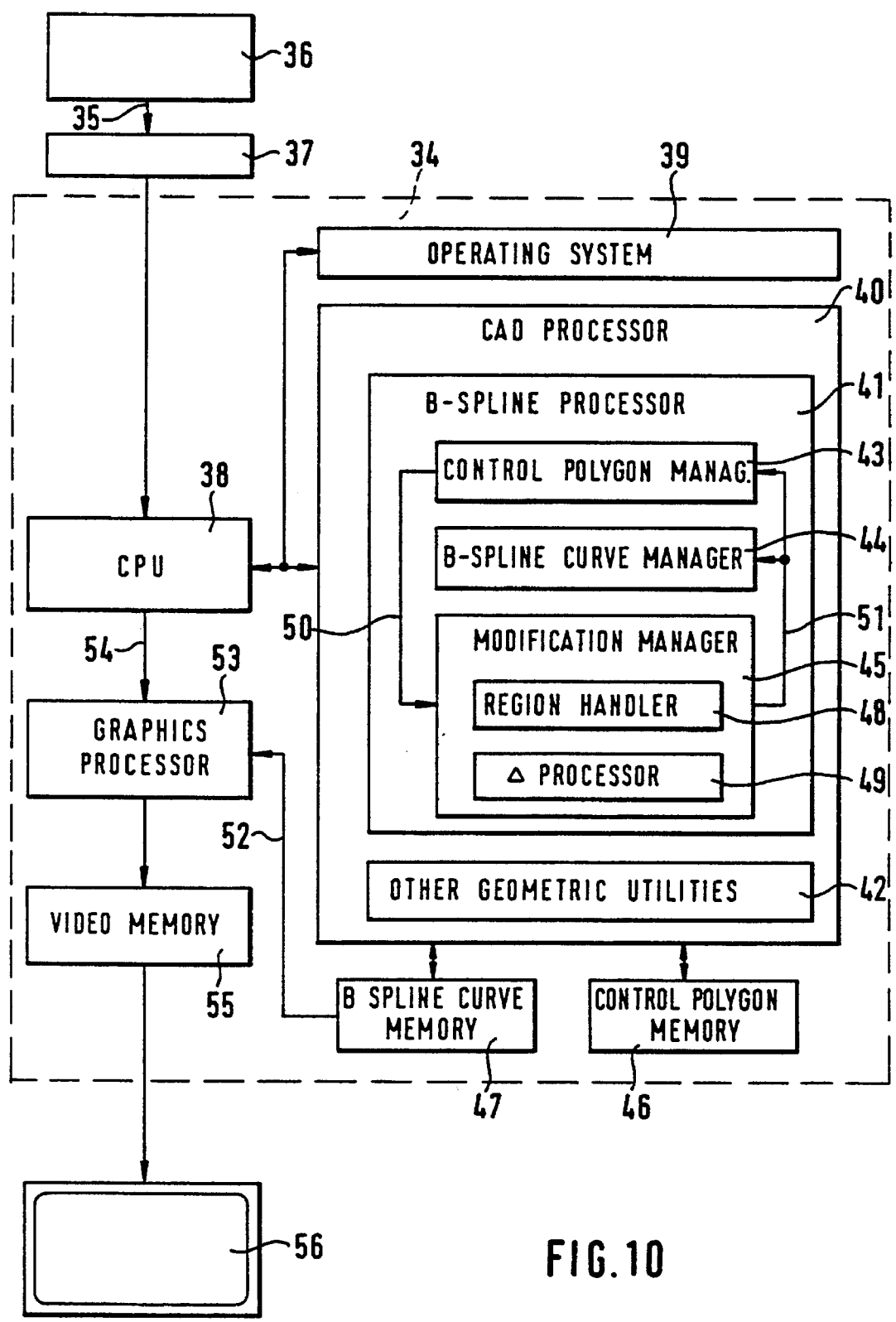
FIG. 10 depicts the basic components of a CAD system incorporating the present invention.

A block diagram with the basic components of a CAD system according to the present invention is shown in FIG. 10.

The main processing unit is designated as 34. The broken line indicates that the components contained in this box are usually contained in a common frame or the like; however, this is not a limiting requirement of the invention (for example, the video memory could be part of the mainframe, but also be incorporated in the display).

Main processing unit 34 receives commands—as indicated by arrow 35—from a user input interlace 36. Interface 36 may e.g. be a keyboard, a computer mouse, a graphics tablet, a touch sensitive screen, a light pen, a trackball or any other suitable human interface means for communicating human commands to the CAD system. These commands are fed, via an input register 37, to a central processing unit (CPU) 38.

CPU 38 communicates with, and executes the commands contained in, several memories such as semiconductor memories or magnetic media. The instructions contained in such memories may be separated, in general, into various processors performing different tasks.

In the example shown in FIG. 10, two such processors have been drawn, namely the operating system 39 and the CAD processor 4D. It is understood that there may also be a variety of other processors, such as a text processor, an electronic mail system or the like, which are not essential for understanding the present invention and have therefore not been drawn in FIG. 10. There may also be additional processors which could be used in the context of the invention, such as a punch handler for generating punch tapes for numerically controlled machine tools, as an output of the CAD system; however, these have also not been drawn, for graphical purposes.

Operating system 39 provides the basic functions for CPU 38, as is commonly known for general purpose computers. CAD processor 40 contains the necessary control code for performing CAD operations. The CAD processor may be further subdivided into utilities or blocks, each performing a specific task.

One such block is the B-Spline processor 41 which provides all functions necessary to process B-Splines. All other functions related to CAD processor 4D, such as the generation of perspective views, dimensioning of parts etc. have been summarized by the block "OTHER GEOMETRIC UTILITIES" 42.

The B-Spline processor 41 basically consists of a control polygon manager 43, a B-Spline curve manager 44 and a modification manager 45. Control polygon manager 43 sets up, retrieves and stores the control points of control polygons associated with B-Spline curves. For this purpose, it has access to a control polygon memory 46. Likewise, B-Spline curve manager 44 processes the interpolation points, and the interpolated curve, of a B-Spline; the interpolation points are stored in B-Spline curve memory 47. (Although the example described here deals specifically with B-Spline curves, it will be understood that B-Spline surfaces could be processed as well).

Modification manager 45 handles the modification of already defined B-Spline curves. It comprises basically a region handler 48 used to define the region of a B-Spline subject to modification, and a $\Delta$ processor 49 which calculates the characteristics of the modified B-Spline, for example the value & according to eqs. (4) or (24), or the $\Delta_0$ and $\Delta_1$ values according to eq. (17). (Other functions may be provided by modification manager 45 as well).

For this purpose, modification manager 45 receives the control points of the unmodified control polygon from control polygon manager 43, as indicated by line 50. Its output, i.e. the control points of the modified control polygon, and the modified B-Spline, are fed to control polygon manager 43 and B-Spline curve manager 44, as indicated by line 51.

The values stored in B-Spline curve memory 47 are fed, via line 52, to a graphics processor 53 under control of CPU 38 (see line 54). The graphics processor is a state-of-the-art processor which transforms the information (e.g., interpolation points) of a B-Spline curve into a two-dimensional graphical representation, e.g. a bit map for a raster display, which is stored in video memory 55, for display on a CRT or other suitable screen 56.

Figure 11:
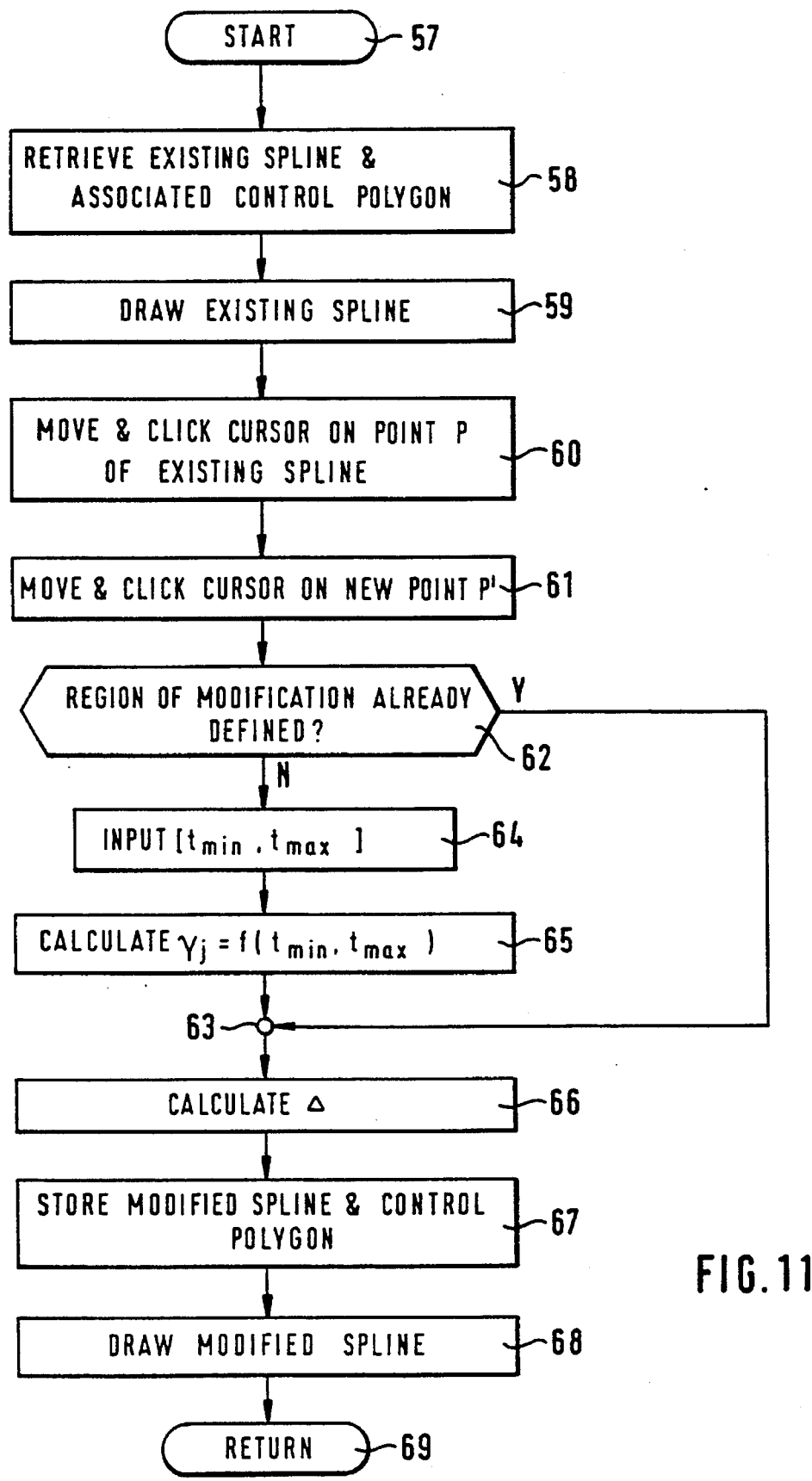
FIG. 11 is a flowchart showing the basic operating steps for performing a Spline modification.

The basic steps of modifying an existing B-Spline curve will now be explained with specific reference to the flowchart of FIG. 11. After invocation of the modification manager 45 (FIG. 10), the flowchart is entered at "START" label 57. If not yet done, the existing B-Spline and its associated control polygon are retrieved from memories 47 and 46 (FIG. 10), as indicated by box 58. The existing Spline is now drawn on the screen (step 59).

A cursor—e.g., a movable cross on the screen—is then moved to a point P of the existing Spline (box 60). Various techniques may be used to catch point P. For example, the current cursor position may be assigned to a point on the Spline as soon as the Spline is in the catch range,, i.e., within a circle or a like contour surrounding the current cursor position. In a more sophisticated system, the cursor may also be "guided" on the Spline curve, i.e., cursor positions outside the Spline curve are not allowed.

As soon as the final cursor, position has been reached, i.e. the cursor is on the point of the Spline curve subject to modification, the user validates or confirms this position by clicking the mouse or otherwise entering an appropriate command. Point P has been caught now, Note that P can be any point on the B-Spline curve, not only its interpolation points.

Next, the cursor is moved: to and clicked on a new point P' outside of the existing Spline curve (box 61). The modified Spline curve should pass through P', instead of P.

In order to limit the modification of the Spline locally, the modification manager (ref. no. 45 in FIG. 10) should know the appropriate limits, i.e. the region of the existing Spline curve subject to modification. Standard limits may be used therefor; instead, these limits may also be user-definable. In the latter case, they may be defined only once, or be redefined for any modification.

In case the region subject to modification is already defined (box 62), operation proceeds to node 63. Otherwise, the limits $t_{min}$, $t_{max}$ are entered by the user (step 64), and the modification processor calculates the corresponding form parameters $\gamma_i$ (step 65). In step 66, the parameters of the modified Spline curve are calculated, e.g. $\Delta$ (according to eqs. (4) or (24)), or $\Delta_0$ and $\Delta_1$ according to eq. (17). The modified Spline curve, i.e., its. parameters, and the asscociated control polygon, are stored (box 67), and the modified Spline curve is drawn on the screen (step 68). Please note that the associated control polygon is usually not depicted on the screen (however, there may be embodiments where this is desirable). Operation then returns to the calling routine (step 69).

What is claimed is:

1. A method for modifying a geometric object in a computer aided design (CAD) system, comprising the steps of:

(1.1) identifying at least one point of origin (P) on a geometric object in a CAD system, wherein said geometric object is defined on the basis of a second function and a first function, wherein said second function comprises a member of a group consisting of B-Spline, Hermite, and Bezier functions, and wherein said first function is a piecewise polynomial function comprising control points, and wherein said geometric object is defined by multiplying said control points by said second function or basic functions of said second function, (1.2) identifying a target point (P') for replacing said point of origin (P), (1.3) transforming the shift of said point of origin (P) on said object to said target point (P') into a shift of at least one control point of said piecewise polynomial function, whereby a locally modified piecewise polynomial function is defined, (1.4) defining a modified geometric object as a locally modified second function of said locally modified piecewise polynomial function.

2. Method according to claim 1, wherein said at least piecewise polynomial function is defined in part by control points, comprising the step of (2.1) transforming the shift of said point of origin (p) to said target point (P') into a shift or modification of said control points.

3. Method according to claim 2, wherein said control points are shifted in substantially the same direction.

4. Method according to claim 2, wherein said control points are shifted for different absolute values.

5. Method according to claim 1, wherein said function is given in parametric representation, and wherein said step of transforming the shift of said point of origin (P) to said target point (P') into a shift or modification of said at least piecewise polynomial function comprises the step of:

(5.1) assigning to said geometric object at the point of origin (P), as well as to said modified geometric object at the target point (P'), the same parameter value or values.

6. Method according to claim 2, wherein said function is a Spline function, particularly a B-Spline function, and said geometric object is defined by the equation:

$$Q(u,v) = \sum_{i,j} M_i(u) N_j(v) P_{ij}$$

u and v being parameters, $M_i(u)$ and $N_j(v)$ being the basic functions of the Spline, $P_{ij}$ being the control points and $Q(u,v)$ being the function defining said geometric object, comprising the step of (6.1) defining said modified geometric object by the following equation:

$$Q'(u,v) = \sum_{i,j} M_i(u) N_j(v)(P_{ij} + C_{ij}),$$

wherein the $C_{ij}$ are offset vectors of said control points.

7. Method according to claim 6, wherein said offset vectors $C_{ij}$ are defined as $$C_{ij} = \Delta \cdot M_i(u_0) \cdot N_j(v_0),$$

$u_0$ and $v_0$ being the parameter values of the point of origin (P) and $\Delta$ being defined as $$\Delta = \frac{P' - P}{\sum_i M_i^2(u_0) \cdot \sum_i N_i^2(v_0)}.$$

8. Method according to claim 2, wherein said function is a Spline function, particularly a B-Spline function, given in parametric representation and dependent on one parameter, and said geometric object is defined by the equation $$Q(t) = \sum_i B_i(t) P_i$$

t being the parameter, $B_i(t)$ being the basic functions of the Spline, $P_i$ being the control points and $Q(t)$ being the function defining said geometric object, comprising the step of (8.1) defining said modified geometric object by the following equation:

$$Q'(t) = \sum_i B_i(t)(P_i + C_i)$$

wherein the $C_i$ are offset vectors of said control points.

9. Method according to claim 8, wherein said offset vectors $C_i$ are defined as:

$$C_i = \Delta \cdot B_j(t_0),$$

$t_0$ being the parameter value of the point of origin (P) and $\Delta$ being defined as $$\Delta = \frac{P' - P}{\sum_i B_i^2(t_0)}$$

10. Method according to claim 8, wherein said offset vectors $C_i$ are defined as $$C_i = \sum_{j=0}^{n-1} \gamma_{i-j} B_j(t_0) \cdot \Delta$$

the $\gamma_i$ being form parameters and $\Delta$ being defined as $$\Delta = \frac{P' - P}{\sum_{i,j} B_i(t_0) \cdot \gamma_{i-j} \cdot B_j(t_0)}$$

11. Method according to claim 8, wherein the $C_i$ are defined as $$C_i = \Delta_0 \cdot B_i(t_0) + \Delta_1 \cdot dB_i(t_0)/dt,$$

$\Delta_0$ and $\Delta_1$ being solutions of the matrix equation $$\begin{pmatrix} \sum_i B_i^2(t_0) & \sum_i B_i(t_0) dB_i(t_0)/dt \\ \sum_i dB_i(t_0)/dt \cdot B_i(t_0) & \sum_i (dB_i(t_0)/dt)^2 \end{pmatrix} \begin{pmatrix} \Delta_0 \\ \Delta_1 \end{pmatrix} = \begin{pmatrix} Q'(t_0) - Q(t_0) \\ dQ'(t_0)/dt - dQ(t_0)/dt \end{pmatrix}$$

and $t_0$ being the parameter value of the point of origin (P).

12. Method according to claim 1, further comprising the steps of (12.1) moving a cursor to said at least one point of origin (P) in order to identify it, (12.2) moving said cursor to said target point (P') in order to identify it, (12.3) calculating the parameters of said modified object, (12.4) storing the parameters of said modified object.

13. Method according to claim 12, further comprising the step of (13.1) entering the limits of the region of said function subject to local modification.

* * * * *